(12) United States Patent
Nishimura et al.

(10) Patent No.: US 8,652,676 B2
(45) Date of Patent: Feb. 18, 2014

(54) ASSEMBLED BATTERY SYSTEM WITH COOLING MEMBER BETWEEN ADJACENT CELLS

(75) Inventors: Katsunori Nishimura, Hitachiota (JP); Masao Shimizu, Hitachi (JP); Tadashi Yoshida, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 315 days.

(21) Appl. No.: 13/028,410

(22) Filed: Feb. 16, 2011

(65) Prior Publication Data

US 2011/0206968 A1 Aug. 25, 2011

(30) Foreign Application Priority Data

Feb. 17, 2010 (JP) ................................ 2010-031933

(51) Int. Cl.
*H01M 10/50* (2006.01)
(52) U.S. Cl.
USPC ........................................................ 429/120
(58) Field of Classification Search
CPC ..................... H01M 10/5048; H01M 10/5057; H01M 10/5059
USPC ........................................................ 429/120
See application file for complete search history.

(56) References Cited

U.S. PATENT DOCUMENTS

| 5,443,926 | A | * | 8/1995 | Holland et al. | 429/120 |
| 5,731,568 | A | * | 3/1998 | Malecek | 219/209 |
| 2002/0012833 | A1 | * | 1/2002 | Gow et al. | 429/120 |
| 2006/0214641 | A1 | | 9/2006 | Cho | |
| 2009/0325053 | A1 | * | 12/2009 | Koetting et al. | 429/120 |

FOREIGN PATENT DOCUMENTS

| JP | 06-333599 | 12/1994 |
| JP | 07-122293 | 5/1995 |
| JP | 08-096837 | 4/1996 |
| JP | 2000-348781 | 12/2000 |
| JP | 2006-278330 | 10/2006 |
| JP | 2009-009889 | 1/2009 |

* cited by examiner

*Primary Examiner* — Zachary Best
(74) *Attorney, Agent, or Firm* — Antonelli, Terry, Stout & Kraus, LLP.

(57) ABSTRACT

The assembled battery system according to the present invention includes at least two non-aqueous electrolyte secondary cells, each including a positive electrode that occludes and emits lithium ions, a negative electrode that occludes and emits lithium ions, and a non-aqueous electrolyte comprising an electrolyte dissolved in a non-aqueous solvent, all received in a parallelepiped cell case. These cells are arranged so that each larger area side of an adjacent pair of the parallelepiped cell case faces in parallel one another. A cooling member with a cooling medium flow conduit is provided between each opposing pair of larger area cell case sides, and cooling medium flowing in this conduit directly contacts the sides of the parallelepiped cell cases that define the two opposite sides of the cooling conduit.

8 Claims, 9 Drawing Sheets

ASSEMBLED BATTERY SYSTEM WITH COOLING MEMBER BETWEEN ADJACENT CELLS

INCORPORATION BY REFERENCE

The disclosure of the following priority application is herein incorporated by reference: Japanese Patent Application No. 2010-031933 filed Feb. 17, 2010.

BACKGROUND OF THE INVENTION

1. Field of the Invention

The present invention relates to a cooling construction for a battery module system that is a combination of at least two non-aqueous electrolyte secondary cells employing parallelepiped cell cases.

2. Description of Related Art

Since lithium ion cells, that may be considered representative of non-aqueous electrolyte secondary cells, have high specific energy density, they are under consideration as cells for batteries for electric automobiles and as cells for energy storage. In particular, as types of electric automobiles, there are a zero emission electric automobile that is equipped with a battery but not with any engine, a hybrid electric automobile that is equipped with both an engine and a secondary battery, and also a plug-in type electric automobile in which the battery is directly charged with electricity derived from an electrical grid. Furthermore, in the field of energy storage, there is a stationary type energy storage system that supplies electrical power in exceptional circumstances when the normal electrical grid power system experiences a power cut.

For these various applications, excellent durability is demanded for a lithium ion cell. In other words there is a demand for a lithium ion cell with low reduction rate of charging capacity and with high retention rate of charging capacity over a long time period, even when the temperature of the surroundings becomes high. However, when a lithium ion cell is used in a system other than an electric automobile in which charging and discharging at high current are required, such as a railroad vehicle or a construction machine or the like, the amount of Joule heat generated in the interior of the cell becomes great, and due to this heat it is quite easy for the electrolyte to be decomposed, or for collapse of the electrode construction to occur. In particular, with a battery module that is made up of a plurality of lithium ion cells, it is difficult to ensure sufficient heat dissipation area from the front surface of the battery, and heat can easily build up in the interior of the module.

As a result, when the battery reaches a high temperature, performance reduction can occur such as decrease of output or of capacity. Accordingly, if a lithium ion battery is used in an application for which charge and discharge at high current is required, cooling of the lithium ion battery becomes very important.

For cooling of a lithium ion battery, apart from air cooling, liquid cooling using a liquid whose specific heat is greater than that of air has also been investigated, and the following per se conventional techniques are known.

In Japanese Laid-Open Patent Publication Heisei 7-122293, there is disclosed a method of cooling a battery by providing it with aluminum fins that are formed as equilateral triangles. In Japanese Patent 3,322,321, there is disclosed a method of cooling a battery by providing a hollow portion equipped with fins that communicates with the exterior of the battery, and by flowing air through the interior thereof. In Japanese Laid-Open Patent Publication Heisei 8-096837, there is disclosed a method in which unit cells are housed internally to a battery module, and cooling is performed by flowing cooled electrolyte over the surfaces of these unit cells. And in Japanese Laid-Open Patent Publication 2000-348781 there is disclosed a technique of covering the positive and negative terminals of a cell with a terminal cooling jacket, and of cooling the positive and negative terminals by circulating a cooling medium in this terminal cooling jacket. Moreover, in Japanese Laid-Open Patent Publication 2006-278330 and in Japanese Laid-Open Patent Publication 2009-009889, there is disclosed a technique of inserting a heat dissipation plate, in which a flow conduit is formed, in the gap between two unit cells, and of cooling the battery by flowing a cooling medium in this flow conduit.

SUMMARY OF THE INVENTION

For an assembled battery system that consists of a plurality of non-aqueous electrolyte secondary cells, it is necessary to cool each of the cells during high current charging and discharging, and moreover to suppress generation of temperature variation in the cells.

When a temperature difference is generated between the unit cells, the residual capacity of each unit cell varies because of variations in the resistances of the cells and in their self-discharge currents. These variations cause the charge/discharge capacity range of each unit cell to varies. As a result the life of a unit cell when it is charged and discharged in the high voltage region becomes shorter, and the overall life of the battery module also becomes shorter, since it is determined by the life of this cell.

The object of the present invention is to provide a cooling construction that can reduce temperature variation of each unit cell, and that can cool the non-aqueous electrolyte secondary cells with good efficiency.

According to the 1st aspect of the present invention, an assembled battery system comprises at least two non-aqueous electrolyte secondary cells, each of which secondary cells is installed in a parallelepiped cell case, and comprises a positive electrode that occludes and emits lithium ions, a negative electrode that occludes and emits lithium ions, and a non-aqueous electrolyte comprising an electrolyte dissolved in a non-aqueous solvent, wherein: the non-aqueous electrolyte secondary cells are arranged so that each larger area side of an adjacent pair of the parallelepiped cell case faces in parallel one another; a cooling member is provided between the adjacent pair of the parallelepiped cell case; and the cooling member comprises an opening portion and an isolating wall, which define a cooling medium flow conduit between two larger area sides of the adjacent pair of the parallelepiped cell case.

According to the 2nd aspect of the present invention, in an assembled battery system according to the 1st aspect, it is preferred that the cooling member has a cooling medium supply inlet and a cooling medium exit outlet, and the opening portion is communicated with the supply inlet and the exit outlet.

According to the 3rd aspect of the present invention, in an assembled battery system according to the 2nd aspect, it is preferred that the supply inlet and the exit outlet are formed on one side of the non-aqueous electrolyte secondary cell, with the supply inlet being provided more towards the center of the cooling member than the exit outlet, and the flow conduit pursuing a path from the supply inlet through the central portion of the cooling member to the peripheral portion thereof, finally arriving at the exit outlet.

According to the 4th aspect of the present invention, in assembled battery system according to the second aspect, it is preferred that a sealing member is provided along a surface of the isolation wall that opposes a side surface of an adjacent non-aqueous electrolyte secondary cell, and the cooling member and the adjacent non-aqueous electrolyte secondary cell are sealed together by the sealing member.

According to the 5th aspect of the present invention, in an assembled battery system according to the 3rd aspect, it is preferred that a sealing member is provided along a surface of the isolation wall that opposes a side surface of an adjacent non-aqueous electrolyte secondary cell, and the cooling member and the adjacent non-aqueous electrolyte secondary cell are sealed together by the sealing member.

According to the 6th aspect of the present invention, in an assembled battery system according to the 4th aspect, it is preferred that an end portion of a supply pipe connected to the supply inlet and an end portion of an ejection pipe connected to the exit outlet are linked into a loop by a circulation pipe, and a cooling medium circulation device and a heat exchange device are installed in the circulation pipe; and the cooling medium is supplied from the circulation pipe into the supply pipe, and is discharged from the ejection pipe into the circulation pipe.

According to the 7th aspect of the present invention, in an assembled battery system according to the 5th aspect, it is preferred that an end portion of a supply pipe connected to the supply inlet and an end portion of an ejection pipe connected to the exit outlet are linked into a loop by a circulation pipe, and a cooling medium circulation device and a heat exchange device are installed in the circulation pipe; and the cooling medium is supplied from the circulation pipe into the supply pipe, and is discharged from the ejection pipe into the circulation pipe.

According to the 8th aspect of the present invention, in an assembled battery system according to the 6th aspect, it is preferred that the cooling medium is a mixture of a glycol type substance and water, or is a fire-retardant cooling medium that is a mixture of one or more of a phosphoric acid ester substance, a phosphorous acid ester substance, or a fatty acid ester substance, or a mixture of one or more of these with mineral oil.

According to the 9th aspect of the present invention, in an assembled battery system according to the 7th aspect, it is preferred that the cooling medium is a mixture of a glycol type substance and water, or is a fire-retardant cooling medium that is a mixture of one or more of a phosphoric acid ester substance, a phosphorous acid ester substance, or a fatty acid ester substance, or a mixture of one or more of these with mineral oil.

With the cooling construction of an assembled battery system according to the present invention, it is possible to reduce temperature variation of each unit cell, and to cool the non-aqueous electrolyte secondary cells with good efficiency.

DESCRIPTION OF THE PREFERRED EMBODIMENT

In the following, an embodiment of a cooling construction for an assembled battery system according to the present invention will be explained with reference to FIGS. 1 through 9.

—Construction of a Secondary Cell—

Figure 1:
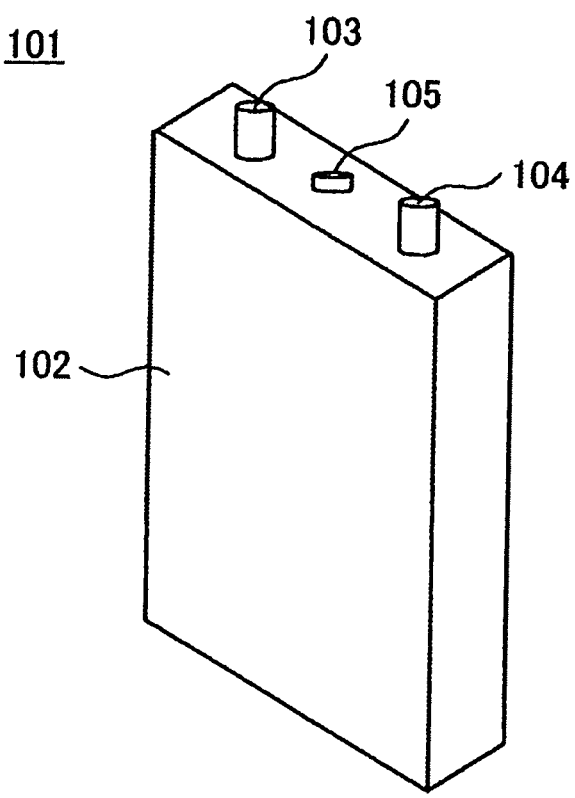
FIG. 1 is a figure showing the external structural appearance of a non-aqueous electrolyte secondary cell of this embodiment.

FIG. 1 shows the external structural appearance of a non-aqueous electrolyte secondary cell employed in the construction of the assembled battery system according to the present invention. Here, a non-aqueous electrolyte secondary cell 101 (hereinafter termed a "cell") is used, and is installed in a parallelepiped cell case 102 (i.e. a cell container). This non-aqueous electrolyte secondary cell 101 has a positive electrode that occludes and emits lithium ions, a negative electrode that occludes and emits lithium ions, and a non-aqueous electrolyte consisting of an electrolyte dissolved in a non-aqueous solvent.

The cell container 102 has a flat surface, and the flat surface is used as a surface for cooling the cell (and is hereinafter termed a "cooling surface"). Since this surface that is utilized is flat, it is simple and easy to attach a cooling member thereto. Since the cell container 102 is flat, it is easy to insert a thin cooling plate, so that it is possible to manufacture a compact assembled battery system. Furthermore, it is desirable to make the cooling surface area as large as possible with respect to the volume of the cell. This is because the rate of heat conduction is proportional to the area. From the above standpoint, in this embodiment, the broadest surface of the cell container 102 is used as its cooling surface. The surface to which the reference symbol 102 points in FIG. 1 corresponds to this cooling surface.

At the upper portion of this non-aqueous electrolyte secondary cell 101 (on the top surface thereof in the embodiment of FIG. 1), there are provided an external positive terminal 103, an external negative terminal 104, and an electrolyte filling hole 105 for injecting a non-aqueous electrolyte into the cell. These terminals are connected to an inverter that supplies power to a motor of an electric automobile, or to a load of some other type, and can be employed for charging and discharging this non-aqueous electrolyte secondary cell 101. Moreover, a valve that breaks open upon elevation of the internal pressure in the battery, or a safety mechanism that intercepts the current when the pressure or temperature rises, is provided in the electrolyte filling hole 105.

In this embodiment of the cooling construction for an assembled battery system according to the present invention, at least two of these non-aqueous electrolyte secondary cells 101 employing this type of parallelepiped cell container 102 are arranged in parallel and are used as an assembled battery system. This is in order to employ a cooling member having a flow conduit in which cooling medium flows between these two adjacent non-aqueous electrolyte secondary cells 101, using for cooling the large sides of their cell containers 102 whose areas are great.

The cooling medium that flows in the flow conduit is directly in contact with the two cell containers 102 on opposite sides of the cooling member, that constitute two opposite surfaces of the cooling conduit. This is in order to provide the beneficial effect of the cooling medium cooling both of the cell containers 102 uniformly and efficiently by contacting them directly. It should be understood that a per se conventional flame-retardant cooling medium is used for the cooling medium, and, in this embodiment of the cooling construction for an assembled battery system according to the present invention, a glycol type mixture such as a mixture of water and ethylene glycol or the like is used. It is desirable that the component ratio of water and ethylene glycol in this mixture to be respectively 30% to 50% and 40% to 60%. Other than a water based cooling medium such as a mixture of water and ethylene glycol, it would also be acceptable to use a fire-retardant cooling medium such as a mixture with mineral oil of a phosphoric acid ester such as a trimethyl-phosphoric acid ester or the like, or of a phosphorous acid ester such as a trimethyl-phosphorous acid ester or the like, or of a fatty acid ester such as a fatty acid silicate ester, a hydrocarbon polyol ester, a fatty acid silane, or the like.

Figure 2:
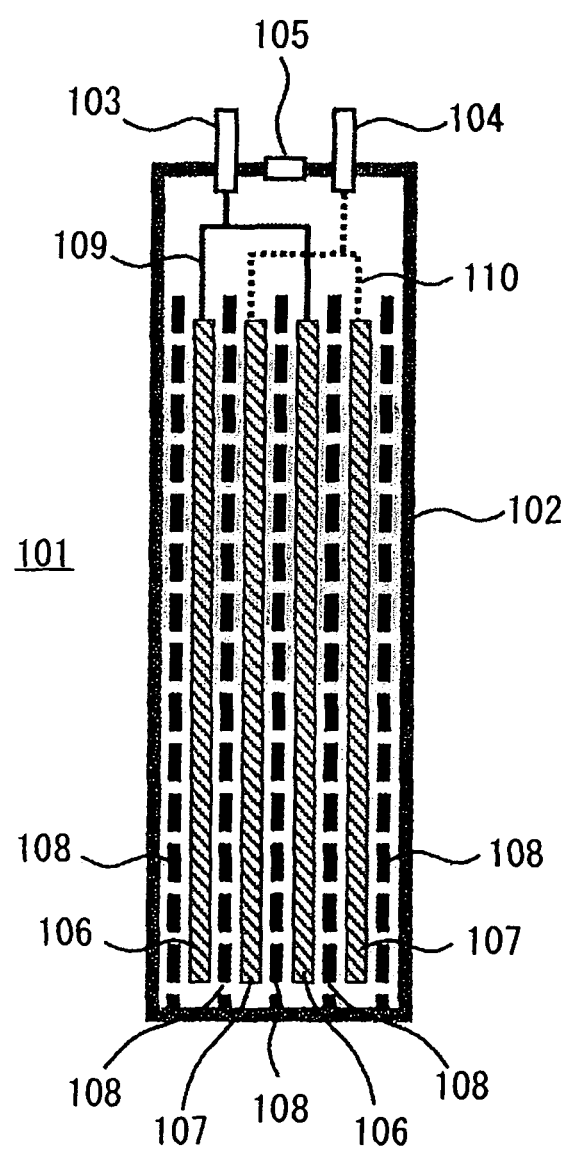
FIG. 2 is a figure showing the cross sectional structure of the non-aqueous electrolyte secondary cell of this embodiment.

FIG. 2 is a figure showing the cross sectional structure of the non-aqueous electrolyte secondary cell 101 of this embodiment, and schematically shows the internal structure of the non-aqueous electrolyte secondary cell 101 of FIG. 1.

Inside its cell container 102, the non-aqueous electrolyte secondary cell 101 includes an electrode group made up from positive electrodes 106, negative electrodes 107, and separators 108 inserted between the positive electrodes 106 and the negative electrodes 107. The separators 108 are also inserted between the positive electrodes 106 and a wall of the cell container, and between the negative electrodes 107 and a wall of the cell container 108, and ensure that no short circuiting takes place between the positive electrodes 106 and the negative electrodes 107 via the cell container 102. The separators 108, the positive electrodes 106, and the negative electrodes 107 hold electrolyte on their surfaces and in a large number of minute internal holes. In the following, this construction including the separators 108, the positive electrodes 106, and the negative electrodes 107 will be termed a "laminated body".

Terminals are provided at the upper portion of the laminated body, and are electrically connected to external terminals via lead wires. The positive electrodes 106 are connected to the external positive terminal 103 via positive lead wires 109. And the negative electrodes 107 are connected to the external negative terminal 104 via negative lead wires 110. It should be understood that, while these lead wires may be shaped as wires, they may also be made in the shape of plates. Any desired shape may be employed, provided that when current flows the ohmic loss is low.

The non-aqueous electrolyte filling hole 105 is provided upon the upper surface of the cell container 102.

In the following, the structural members, materials, and method of use thereof employed for an example of a lithium ion battery that uses a lithium salt as the non-aqueous electrolyte according to the present invention will be explained. As described above, the lithium ion battery of this embodiment includes the positive electrodes 106, the negative electrodes 106, and the separators 108, all held within the cell container 102; and furthermore, a non-aqueous electrolyte made by adding a lithium metal oxide to a non-aqueous solvent is injected from the filling hole 105.

The positive electrodes 106 are each made from a positive electrode active material, an electrically conductive substance, a binder, and a current collector. A lithium metal oxide such as $LiCoO_2$, $LiNiO_2$, $LiMn_2O_4$ or the like, or a compound metal oxide including two or more transition metal oxides including these, may be used for the positive electrode active material. Some other material could be used, provided that it is a positive electrode active material with a lower oxidation reduction potential than the electrolytic voltage of the non-aqueous electrolyte.

The particle diameter of the positive electrode active material is regulated so as to be less than the thickness of the mixture layer. If coarse grains are present in the powdered positive electrode active material and have sizes greater than the thickness of the mixture layer, then a powder with grains smaller than the thickness of the mixture layer should be manufactured by eliminating the coarser grains by screening processing, air blowing separation processing, or the like. Moreover, since the positive electrode active material is a compound oxide and its electrical resistance is high, accordingly an electrically conductive substance made from carbon powder is employed for enhancing that electrical conductivity. Since both the positive electrode active material and the electrically conductive substance are in powder form, when a binder is mixed in with these powders, the powders themselves combine together, and simultaneously they adhere to the collector body.

The collector bodies of the positive electrodes 106 are shaped as rectangular sheets, and are made from aluminum foil of thickness 10 to 100 µm, or from perforated aluminum foil of thickness 10 to 100 µm with holes of diameter 0.1 to 10 mm formed therein, or from expanded metal, foamed metal plate, or the like; and, as the material for these bodies, it would also be acceptable to employ stainless steel, titanium, or the like. It should be understood that the material, the shape, the method of manufacture and so on of these current collectors of the positive electrodes 106 is not to be considered as being particularly limited: provided that it is not altered by the non-aqueous electrolyte, any desired material, shape, or method of manufacture may be employed.

After a positive electrode slurry made by mixing together the positive electrode active material, the electrically conductive substance, a binder, and an organic solvent has been adhered to the collector body by a doctor blade method, a dipping method, a spray method or the like, the organic solvent is removed by drying, and then the positive electrode 106 may be pressure formed by roll pressing. Moreover, by repeatedly performing these processes from application to drying, it is also possible to form a multi-layered current collector upon which a plurality of mixture layers are laminated.

The negative electrodes 107 are made from a negative electrode active material, a binder, and a current collector. Furthermore, if charging and discharging at a high rate will be required, then in some cases an electrically conductive substance is also added. For the negative electrode active material, aluminum, silicon, tin or the like, which can make an alloy with lithium, may be used; or a carbonaceous material made from graphite or amorphous carbon that can electrochemically occlude and emit lithium ions may also be used.

While in this embodiment there is no particular limitation upon the negative electrode active material and it would be possible to employ materials other than those described above, a negative electrode whose main component is a carbonaceous material is particularly suited to this embodiment. Since the negative electrode active material is generally used in the form of a powder, and this is mixed into a binder, these two powders are adhered to the collector body at the same time as they are combined together. In this embodiment, it is desirable for the diameter of the particles of the negative electrode active material of the negative electrodes 107 to be less than or equal to the thickness of the mixture layer. If coarse grains are present in the powdered negative electrode active material and have sizes greater than the thickness of the mixture layer, then particles that are smaller than the thickness of the mixture layer should be manufactured by eliminating the coarser grains by screening processing, air blowing separation processing, or the like.

The current collectors of the negative electrodes 107 are shaped as rectangular sheets, and are made from copper foil of thickness 10 to 100 μm, or from perforated copper foil of thickness 10 to 100 μm with holes of diameter 0.1 to 10 mm formed therein, or from expanded metal, foamed metal plate, or the like; and, as the material for these bodies, apart from copper, it would also be acceptable to employ stainless steel, titanium, nickel, or the like. It should be understood that, in this embodiment, the material, the shape, the method of manufacture and so on of these current collectors of the negative electrodes is not to be considered as being particularly limited: any desired material, shape, or method of manufacture may be employed, provided that it is not altered by the non-aqueous electrolyte. In other words, there is the requirement that it should be a material that does not dissolve under the oxidation reduction potential of the active material of the electrode, and that does not change to a oxide having high electrical resistance.

After a negative electrode slurry made by mixing together the negative electrode active material, a binder, and an organic solvent has been adhered to the current collector by a doctor blade method, a dipping method, a spray method or the like, the organic solvent is removed by drying, and then the negative electrode 107 may be pressure formed by roll pressing. Moreover, by repeatedly performing these processes from application to drying, it is also possible to form a multi-layered current collector upon which a plurality of mixture layers are laminated.

In order to prevent the positive electrodes 106 and the negative electrodes 107 manufactured in the above manner from short circuiting, the separators 108 are interposed between the positive electrodes 106 and the negative electrodes 107 to form a laminated construction. The separators 108 may be made from a polyolefin type polymer sheet consisting of polyethylene, polypropylene or the like, or may also be made in a two layer construction consisting of a polyolefin type polymer sheet with a fluorine type polymer sheet, such as polytetrafluoroethylene as representative, or the like, attached thereto by welding.

It would also be acceptable to form thin layers consisting of a mixture of a ceramic and a binder on the surfaces of the separators 108, in order for the separators 108 not to contract when the temperature of the cell becomes high. Since it is necessary for the lithium ions to pass through these separators 108 during charging and discharging of the cell, generally, they may be used in a non-aqueous electrolyte secondary cell of this type if they are formed with holes of small diameter of 0.01 to 1 μm, and with a porosity of 20% to 90%.

A plurality of laminated electrode groups are manufactured by sandwiching separators 108 between positive electrodes 106 and the negative electrodes 107 in this manner. This type of electrode group may have various shapes: it may be shaped as a rectangular plane laminated mass as shown in FIG. 2, or the separators 108, the positive electrodes 106, and the negative electrodes 107 may be rolled up into a circular cylindrical shape or into a flattened cylindrical shape, or the like.

The shape of the cell container 102 is selected to match the shape of the electrode group: it may be shaped as a circular cylinder, as a flattened elliptical cylinder, as a parallelepiped, or the like. In this embodiment, in consideration of cooling efficiency, the parallelepiped shape is selected. The present invention may be applied, provided that the cell container 102 has a flat portion against which a cooling member can be contacted.

The material employed for the cell container 102 may be any material that has good resistance to corrosion by the non-aqueous electrolyte, such as aluminum, stainless steel, nickel plated steel, or the like. Moreover, the selection of material for the cell container 102 should be performed so that, when the cell container 102 is electrically connected to the positive electrode 106 or to the negative electrode 107, at the portion coming into contact with the non-aqueous electrolyte, corrosion thereof or alteration of the material due to alloying with lithium ions does not take place.

The electrode group is housed in the cell container 102, and the non-aqueous electrolyte is injected into the cell container 102. It should be understood that it would also be acceptable to arrange to connect the negative electrode to the cell container and the positive electrode to a lid thereof. However, in this embodiment, individual terminals (103 and 104) are provided. The method for injecting the non-aqueous electrolyte may be to pour it directly upon the electrode group in the state with the lid taken off, or may be to inject it through the electrolyte filling hole 105 in its state with the lid installed. Thereafter, the lid is tightly fitted to the cell container, so that the cell as a whole is sealed. If an electrolyte filling hole 105 for the non-aqueous electrolyte is provided, then that is sealed up. A technique such as welding, swaging, or the like may be employed for sealing the cell.

Representative examples of the electrolyte that can be used in this embodiment are lithium hexafluorophosphate ($LiPF_6$) or lithium tetrafluoroborate ($LiBF_4$) dissolved in a solvent consisting of a mixture of dimethyl carbonate, diethyl carbonate, ethyl methyl-carbonate or the like in ethylene carbonate. The electrolyte is not to be considered as being particularly limited, provided that it is a substance that can be used for repeated charging and discharging. In this embodiment, the type of the electrolyte and the mixing ratio of the solvent is not particularly limited; some other electrolyte could also be used.

The electrolyte could also be used in a state containing polymers of high ionic conductivity, such as polyvinylidene fluoride, polyethylene oxide or the like. In this case the separators would be unnecessary. Furthermore, instead of a non-aqueous electrolyte, a solid polymer electrolyte or a gel electrolyte may also be used. As a solid polymer electrolyte, a polymer electrolyte such as polyethylene oxide or the like may be used; and, as a gel electrolyte, a mixture of polyvinylidene fluoride and a non-aqueous electrolyte may be used. Moreover, an ionic liquid could also be used.

The construction will now be explained of a battery module that is manufactured using secondary cells made in the manner explained above.

—Construction of the Battery Module—

Figure 3:
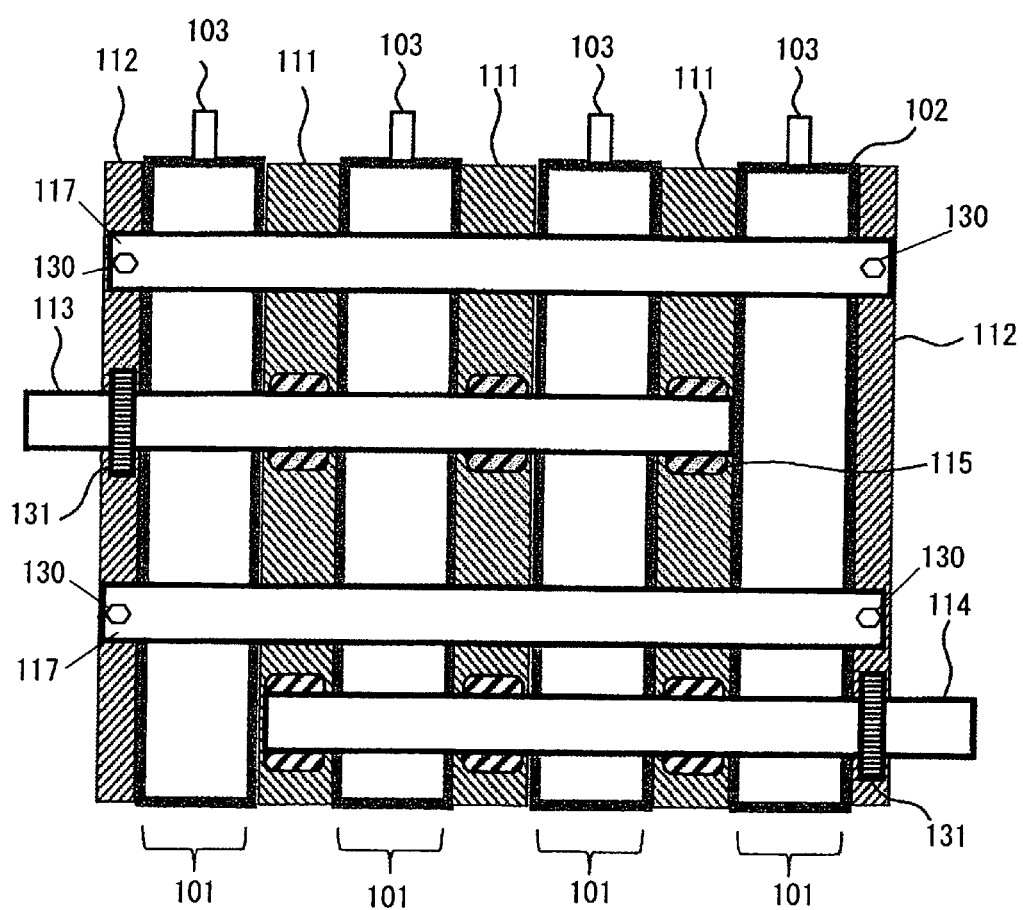
FIG. 3 is a side view of the battery module of this embodiment.

FIG. 3 is a side view of the battery module according to this embodiment, and shows the arrangement of components for supplying a cooling medium to cooling members and recuperating the cooling medium after it has taken away heat. In this case, four parallelepiped cells 101 are arranged in a line, so that their broadest sides with greatest area oppose one another. The external positive terminals and the external negative terminals provided at the upper portions of their cell containers 102 are linked together by cables, so as to be connected in series. It should be understood that, in FIG. 3, the cables for connecting between these terminals are omitted. Furthermore, since FIG. 3 is a side view in which the parallelepiped cells are viewed from their sides that are of smaller area, in this view, the external positive terminal and the external negative terminal of each cell are overlapped because they are in the same line from the viewer. Thus, in FIG. 3, only the external positive terminal 103 of each of the cells 101 can be seen. In other words, this FIG. 3 is a side view as seen in the direction from the upper left side of the perspective view shown in FIG. 1 towards its lower right.

Figure 8:
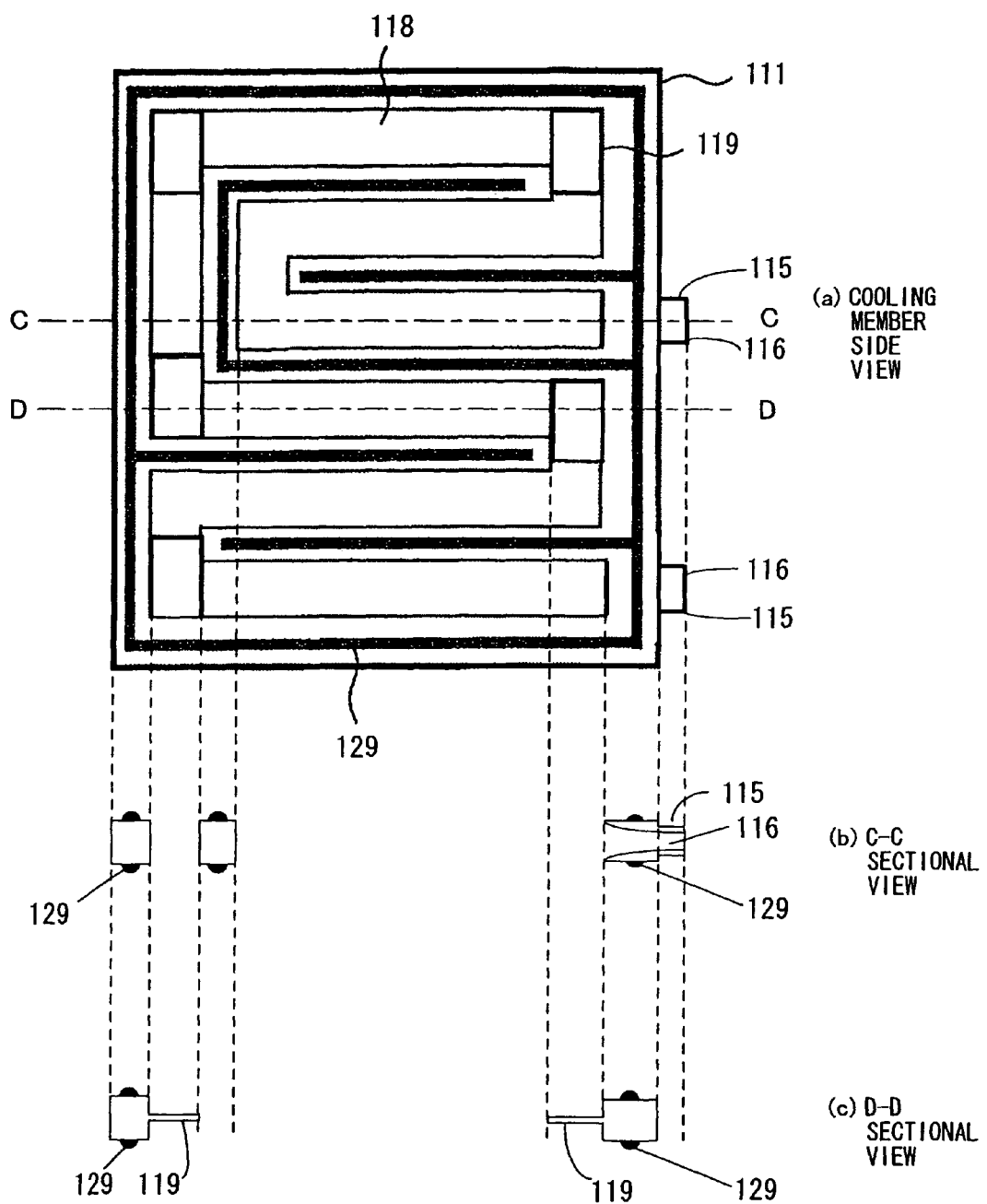
FIG. 8 shows a side view and its sectional views of the construction of a cooling member of this embodiment that is provided with a seal. (a) represents the side view of the cooling member. (b) is the sectional view of (a) in the position C-C, and (c) is the sectional view of (a) in the position D-D.

A cooling member 111 is inserted between each pair of neighboring cells 101, and end plates 112 are installed at both ends of this battery module that consists of four parallelepiped cells and three cooling members. These end plates are fixed to reinforcement plates 117 by bolts 130 from the sides of the reinforcement plates 117, or by adhesion. A total of four of these reinforcement plates 117 are provided, two at upper and lower parts of the side surface shown in FIG. 3, and two at upper and lower parts of the opposite rear side surface. As shown in FIG. 8, using a sealing substance such as, for example, an ethylene-propylene rubber or the like, along isolation walls 118a (refer to FIG. 4) formed in the cooling member 111 that define a flow conduit 118, around the external periphery of the cooling member 111, and around the connection portions 115, a sealing member 129 is formed in a convex shape upon the surface of the external portion of the cooling member 111 that contacts the side surface of the parallelepiped cell 101, so that cooling medium cannot leak out from the cooling member 111 or the connection portions 115. With the entire battery system assembled so that, as shown in FIG. 3, the cooling members 111 of this type are sandwiched between each adjacent pair of two parallelepiped cells 101, and in the state in which pressure is being applied to the end plates 112 on both ends and from them to the assembly of parallelepiped cells 101 and cooling members 111, the reinforcement plates 117 and the end plates 112 are coupled together by the bolts 130 so that the entire assembly is held tightly together. The through holes in the reinforcement plates 117 through which the bolts 130 pass are made as elongated holes extending along the length direction of the reinforcement plates 117.

For this sealing member, a rubber of some other type than silicon rubber, fluorine rubber or the like, or an adhesive, or a thermosetting resin such as epoxy resin or the like, may be used. Any desired material may be employed for the sealing member, provided that it is a material that does not react with the cooling medium, and provided that it is not dissolved by the cooling medium and does not change at the operating temperature of the battery module.

A cooling medium supply pipe 113 is fixed by bolts to the side of the end plate 112 using fixing components 131 (refer to FIG. 6), or may be adhered thereto. Portions of this cooling medium supply pipe 113 are connected to all of the cooling members 111 by connection portions 115, and thereby the cooling medium is supplied from the cooling medium supply pipe 113 to all of the cooling members 111. The supply of cooling medium to the cooling medium supply pipe 113 is implemented by using a liquid impulsion device not shown in FIG. 3. A per se known device such as a circulation pump, a micro pump, or the like may be used as this liquid impulsion device.

The cooling medium passes along the flow conduits that are defined in the interior of the cooling members 111, and, after having abstracted heat from the side surfaces of the cells 101 on both sides, is ejected from the connection portion 115 at the lower part of FIG. 3 to a cooling medium ejection pipe 114 and is recuperated. It should be understood that the cooling medium ejection pipe 114 is similarly fixed by bolts to the side of the end plate 112 using fixing components 131, or may be adhered thereto. After the cooling medium in the cooling medium supply pipe 114 has been recovered and has passed through a heat exchange device not shown in FIG. 3, it is returned back to the cooling medium supply pipe 113 again by the liquid impulsion device. Here, for this heat exchange device, a per se known cooling device such as a heat exchanger or a radiator or the like may be used.

In this manner, in this embodiment, the cooling medium supply pipe 113 is installed at a more central portion of the cooling member 111 than the cooling medium ejection pipe 114. This is done in order to provide a construction that cools the cells 101 more efficiently, in consideration of the pattern of heat generation in the cells 101. Heat can easily accumulate in the central portion of a lithium ion cell, and accordingly this higher temperature portion is supplied with cooling medium at a lower temperature, in order for it to be cooled more rapidly. Since there is some dissipation of heat at the external peripheral portions of the cells due to contact with the external air, and since these portions are accordingly at lower temperature, the cooling medium is passed, at its coolest stage, past the central portions of the cells where the temperature may be expected to be somewhat elevated. It becomes possible to cool the battery more efficiently in this manner, and thus to make its overall temperature more uniform.

—Construction of the Cooling Members—

Figure 4:
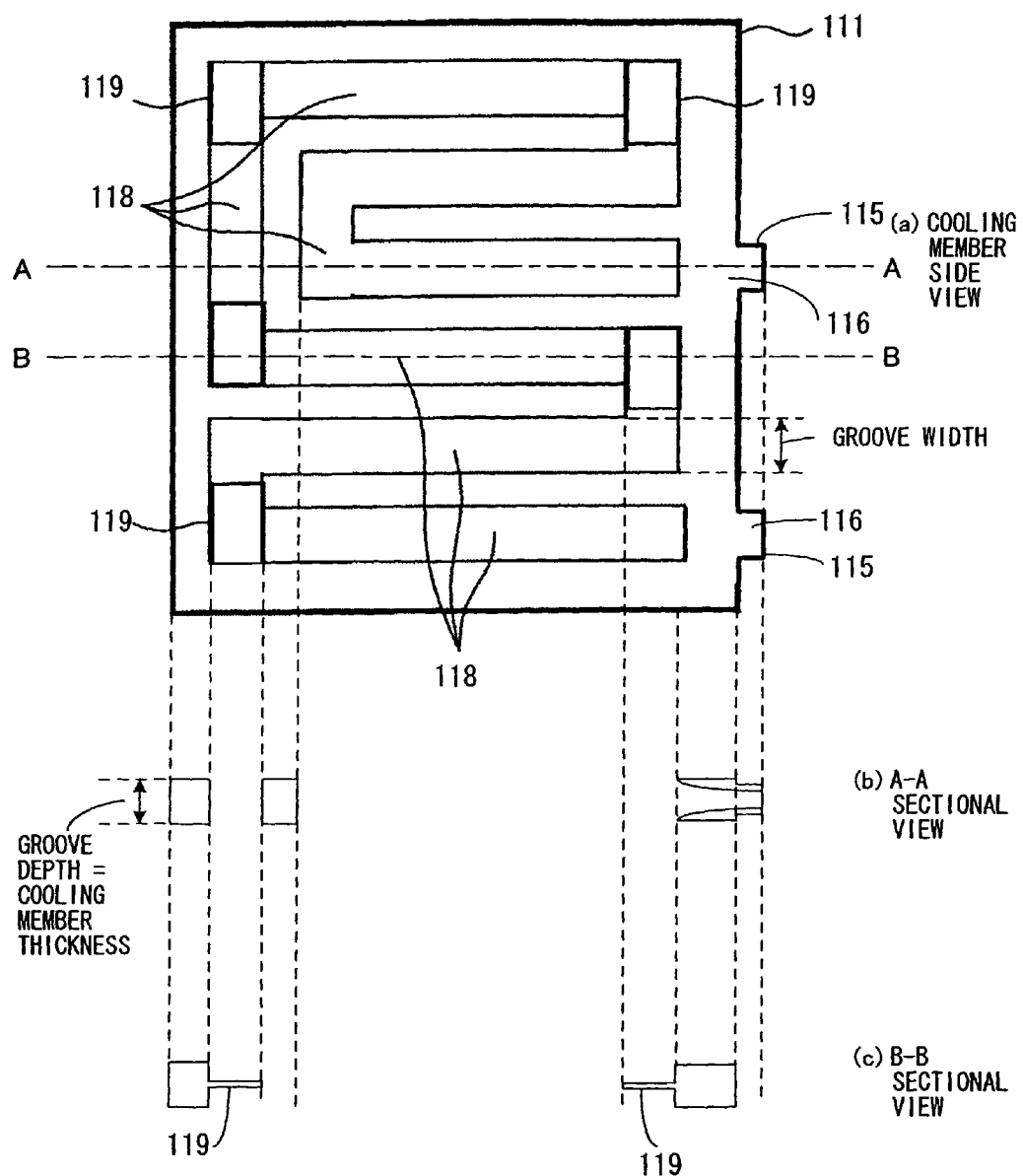
FIG. 4 shows a side view and its sectional views of the construction of a cooling member of this embodiment. (a) represents the side view of the cooling member. (b) is the sectional view of (a) in the position of A-A, and (c) is the sectional view of (a) in the position B-B.
Figure 5:
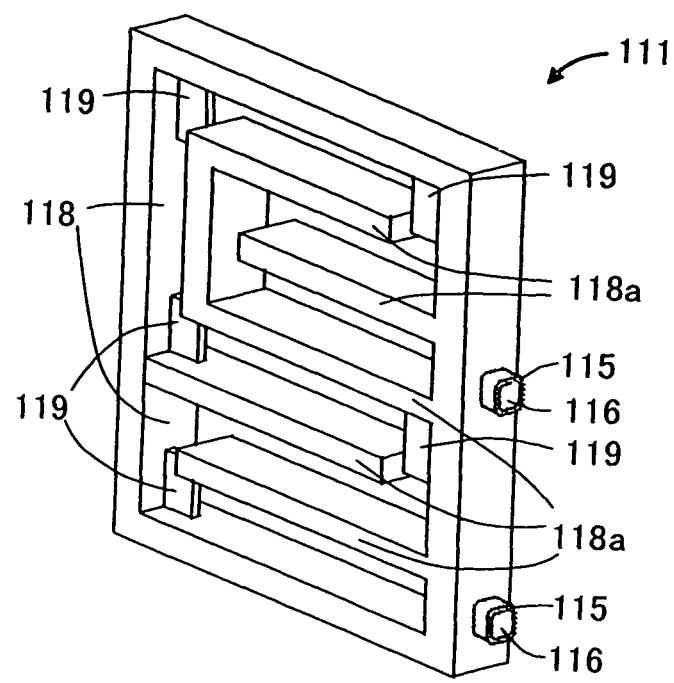
FIG. 5 is a perspective view showing the construction of a cooling member of this embodiment.

As shown in FIG. 3, each of the cooling members 111 is installed by being sandwiched between two adjacent ones of the secondary cells 101. The cooling member 111 is formed as a rectangular parallelepiped that has approximately the same rectangular shape on its sides of greatest area that are in contact with the sides of cell containers 102 of the secondary cells 101 shown in FIG. 3, as the corresponding sides of those cell containers 102, but that is thinner in its thickness direction perpendicular to those sides; and it may, for example, be made from an aluminum alloy block by a convoluted opening portion being pierced through the block, for example by milling away portions thereof, so as to define a flow conduit. Thus, two tubular portions 116 that communicate with the flow conduit are formed by being milled out on one of the side surfaces of this aluminum alloy block whose area is smaller, that is to say, on the side of the cooling member 111 shown in FIG. 3. As will be described hereinafter, the battery system is assembled so that the sides of this cooling member having the largest area are contacted against the sides of the secondary cell containers 102 having the largest area via sealing members; in FIG. 3, these cooling members 111 are seen from their sides that have the smaller area, in a similar manner to the view in which figure of the parallelepiped secondary cells 101. FIG. 4 shows a cooling member 111 as seen from its side that has the greatest area, while FIG. 5 is a perspective view of a cooling member 111. A construction incorporating isolating walls 118a is shown, and these are portions of the aluminum alloy block described above other than its opening portion described above that are left remaining, and that are not milled away during the formation of the flow conduit 118 defined by the opening portion in the cooling member 111. It should be understood that the material used for this cooling member 111 could be some metal other than aluminum alloy; any suitable material could be used, provided that, as described above, it does not suffer corrosion due to the cooling medium.

The cooling medium enters from the connection portion 115 via the tubular portion 116 into the flow conduit 118. Here, as described above, the flow conduit 118 is made from the opening portion that is pierced through the aluminum alloy block in its thickness direction. Due to this, the cooling medium that flows in the flow conduit 118 comes directly into contact with the cell containers 102 on both sides, and, along with enhancing the beneficial cooling effect, this also provides the advantageous effect of equalizing any temperature difference between the two cells 101. The dimension of the flow conduit 118 that is thus defined by the sides of the cell containers 102 and by the cooling member 111 in its thickness direction (i.e. the depth of its defining groove) may be around 3 to 10 mm, while its dimension in the direction parallel to the large sides of the cell containers 102 (i.e. the width of its defining groove) may be around 3 to 20 mm, so that the cross sectional area of the flow conduit may be in the range of around 9 to 200 $mm^2$: these dimensional ranges are considered to be suitable from the point of view of enhancing the cooling capability and moreover of avoiding too much pressure drop when the cooling medium flows through the conduit 118. Moreover in particular from the point of view of preventing stagnation of air bubbles in the flow conduit 118, it is desirable for its groove depth described above to be in the range of 4 to 8 mm and for its cross sectional area to be in the range of 16 to 64 $mm^2$.

The fact that the flow conduit 118 progresses from the connection portion 115 at the central portion of the cooling member 111 is a distinguishing feature of the cooling member 111 of this embodiment. By initially flowing the cooling medium that is at low temperature into the conduit 118 near the center of the cooling member in this manner, it is possible rapidly to eliminate heat in the central portions of the secondary cells 101, where heat can easily be built up.

It is desirable to manufacture the flow conduit 118 so that its area ratio at its external peripheral portion becomes greater than its area ratio at its central portion, since the amount of heat transmitted from the cell containers 102 to the external peripheral portion of the conduit 118 is large. Thus, in the case of cells 102 whose side surfaces are large, it is preferred for the groove width at the external peripheral portion of the flow conduit 118 to be greater than its groove width at its central portion. Furthermore, it is desirable for the groove width of the flow conduit 118 at its external peripheral portion to be from 1 to 1.5 to 2 times greater than its groove with at its central portion.

Since the flow conduit 118 is cut completely through the cooling member 111, partial link portions 119 are provided. These link portions 119 are formed at intermediate positions along the thickness direction of the cooling member 111, so that the flow of cooling medium is able to divide into two streams that flow on both sides of these link portions 119 (refer to FIG. 4(c) and FIG. 5). After having proceeded past these link portions 119, these two cooling medium flows come together again and continue to flow along the flow conduit 118.

Since in this manner, with this embodiment, the sides of the two cell containers 102 that sandwich the cooling member 111 on both its sides are directly cooled by the same flow of cooling medium, accordingly it becomes possible to cool the adjacent pairs of cell containers 102 with good efficiency and moreover with liquid that is at the same temperature. As a result, it is possible to keep variation of temperature between the various cells extremely low.

In other words, in this embodiment, the cooling member 111 has a cooling medium supply inlet (installed at 115 at its central upper portion) and a cooling medium exit outlet (installed at 115 at its peripheral lower portion), and the flow conduit 118 communicates from this supply inlet to that exit outlet. And the supply inlet and the exit outlet of the flow conduit 118 are formed to face to one side of the non-aqueous electrolyte secondary cells 102, with the supply inlet being formed more towards the center. Furthermore, from the supply inlet, the flow conduit 118 pursues a path towards the central portions of the non-aqueous electrolyte secondary cells 102, then pursues a path towards the external peripheral portions of the non-aqueous electrolyte secondary cells 102, and then reaches the exit outlet.

Figure 6:
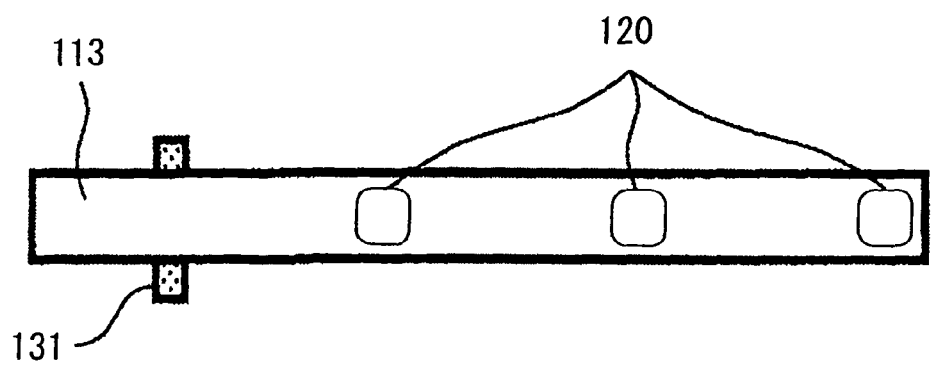
FIG. 6 is a figure showing the construction of a cooling medium supply conduit (or of an ejection conduit) of this embodiment.

FIG. 6 shows the construction of one of the cooling medium supply conduits or ejection conduits in this embodiment, and could refer either to the cooling medium supply pipe 113 or to the cooling medium ejection conduit 114 used in FIG. 3. In other words, FIG. 6 shows the surface of this construction that is held tightly against the connection portions 115 of the cooling member 111 of FIG. 3.

The fixing components 131 shown in FIGS. 3 and 6 are fixed from the rear surface of the cooling medium supply pipe 113 (or of the cooling medium ejection conduit 114) of FIG. 6 forwards (i.e. in the direction perpendicular to the drawing paper). While this fixing can be performed by using bolts or adhesive, in FIG. 3, an example is shown in which bolts are employed.

The connection portions 115 shown in FIGS. 3 and 5 are tightly fixed so as to cover the opening portions 120 of FIG. 6. When a sealing member is formed in a convex shape upon the surfaces of the connection portions 115 or around the peripheries of the opening portions 120, it is possible to ensure that the cooling medium flows from a cooling medium supply pipe 513 into the connection portions 315 without leakage. It should be understood that the construction used for the cooling medium ejection pipe 114 is the same as the construction shown in FIG. 6. In other words, the cooling medium supply conduit is connected to the supply inlet with the interposition of a sealing member, and the cooling medium ejection pipe is connected to the exit outlet with the interposition of a sealing member. It should be understood that, while the tubular portions 116 having rectangular cross sections are provided to the connection portions 115 shown in FIG. 5, these connection portions 115 in FIG. 5 could also include tubular portions having circular cross sections. If the cross sections of these tubular portions are circular, then it is desirable for the shapes of the opening portions 520 shown in FIG. 6 also to be circular, in order for them to match.

Figure 7:
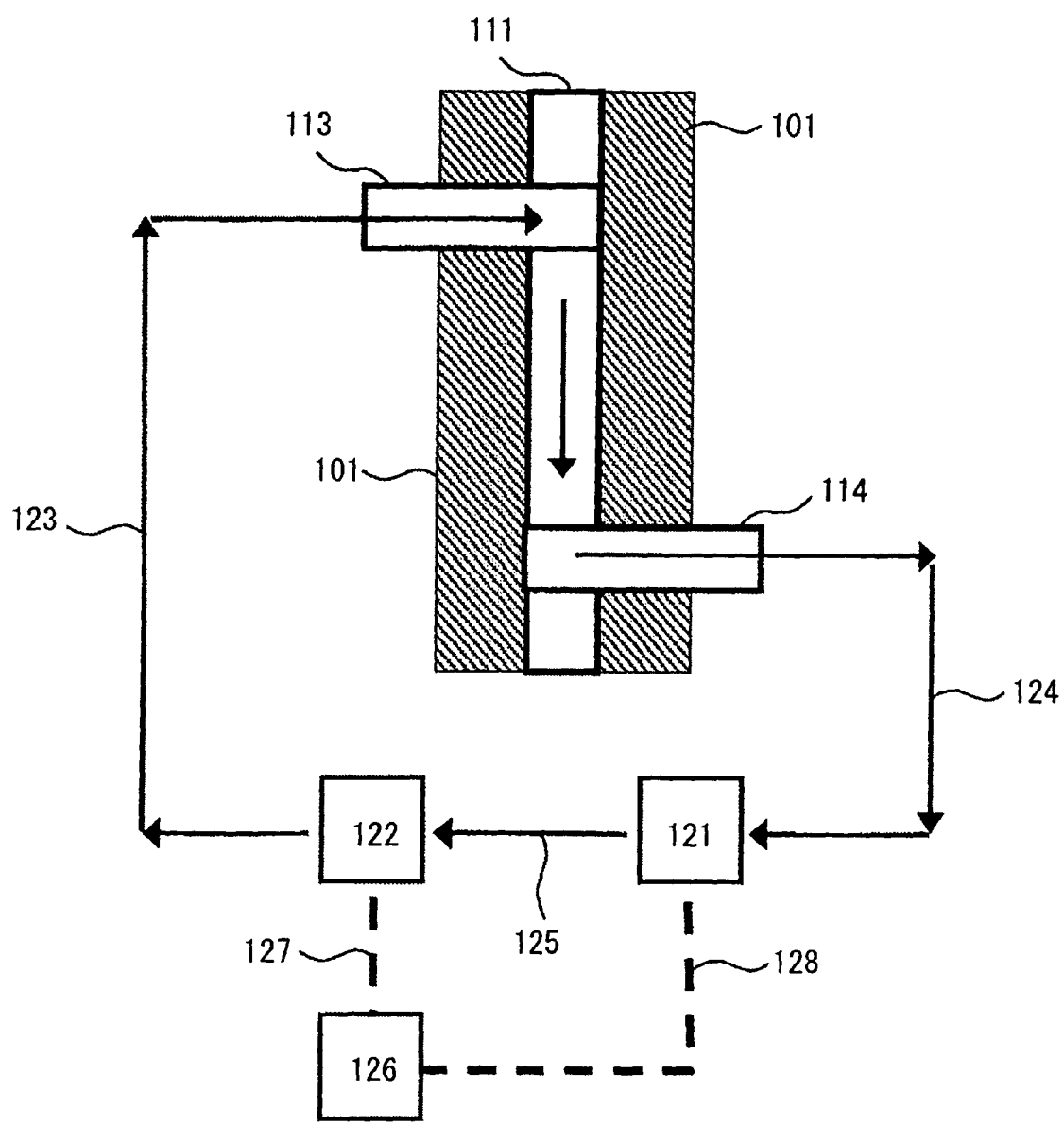
FIG. 7 is a view showing the structure of an assembled battery system according to this embodiment.

FIG. 7 is a figure schematically showing the structure of the battery module system according to this embodiment, and also shows the overall structure of a battery system for cooling the non-aqueous electrolyte secondary cells 101 thereof by circulation of cooling medium. While here, in this example, a minimum structure is shown in which a single cooling member 111 is sandwiched between two non-aqueous electrolyte secondary cells 101, the same would hold for a system that employed a larger number of non-aqueous electrolyte secondary cells 101 and a larger number of cooling members 111.

The cooling medium is supplied to the cooling medium supply pipe 113 via a liquid supply pipe 123, using a liquid impulsion device 122. Any suitable type of pump may be used for the liquid impulsion device 122, such as a magnetic pump, a diaphragm pump, or the like. The liquid impulsion device 122 is controlled via a signal cable 127 by an electrical signal, according to a program that is installed upon a control device 126 of this battery module system.

Next, the cooling medium is supplied to the flow conduit 118 by the connection portion of the cooling member 111, and, after having flowed through this flow conduit 118 and having removed heat from the two secondary cells 101, is discharged via the cooling medium ejection pipe 114. This cooling medium that has abstracted heat flows through the liquid supply pipe 124, and is cooled by the heat exchange device 121. After having been thus cooled, the cooling medium passes through the liquid supply pipe 125, and returns back to the liquid impulsion device 122 for a second time.

A per se known type of heat exchanger such as a plate type heat exchanger, a radiator, or the like may be used for the heat exchange device 121. The temperature control conditions of the heat exchanger are controlled by an electrical signal via a signal cable 128, according to a program that is installed upon the control device 126.

In other words, the end portion of the supply pipe (i.e. the cooling medium supply pipe 113) and the end portion of the ejection pipe (i.e. the cooling medium ejection pipe 114) are linked into a loop by the circulation pipes (i.e. the liquid supply pipe 123, the liquid supply pipe 124, and the liquid supply pipe 125), with a cooling medium circulation device (i.e. the liquid impulsion device 122) and the heat exchange device 121 being installed in those circulation pipes, so that the cooling medium is supplied to the supply pipe from the circulation pipes, and is discharged to the circulation pipes from the ejection pipe.

Now this embodiment will be explained in further detail. In the following an example of manufacture of a parallelepiped non-aqueous electrolyte secondary cell (i.e. of a lithium ion secondary cell) according to this embodiment will be shown and explained.

As shown in FIG. 2, except for its projecting portions, i.e. the external positive terminal 103, the external negative terminal 104, and the electrolyte filling hole 105, the dimensions of the cell container 102 are: height 200 mm, width 100 mm, depth 10 mm. Ten of these cells were manufactured, and were assembled into a 10-in-series module.

$LiMn_2O_4$ was used for the positive electrode active material and natural graphite was used for the negative electrode active material, and polyvinylidene fluoride was used for the binders of both electrodes. The rated capacity of the cell was 40 Wh.

Next, to produce the structure shown in FIG. 3, the cooling member 111, the cooling medium supply pipe 113, the cooling medium ejection pipe 114, the end plates 112, the reinforcement plates 117, and so on were assembled. With the exception of its connection portions 115, the cooling member 111 was formed in a parallelepiped shape, and its external dimensions were: height 200 mm, width 100 mm, and thickness 4 mm.

The shape of the flow conduit pattern was as shown in FIG. 4: the width of the flow conduit 118 was 20 mm and its depth was 4 mm (this was of course the same as the thickness of the cooling member 111). At the four places where the flow changed through 180° (hereinafter termed the "folded back places"), the gap between the two side-by-side grooves was 10 mm. The dimensions of the link portions 119 were: width 20 mm, length 30 mm, and thickness 0.5 mm. The material used for the cooling member 111 was aluminum alloy. It should be understood that, as previously described, it is particularly desirable for the width of the flow conduits 118 and 119 to be in the range of 3 to 8 mm, and for their cross sectional areas to be in the range of 9 to 64 $mm^2$, in order to prevent stagnation of air bubbles in the flow conduit 118. It would be possible to increase the number of folded back places to be more than the four shown in FIG. 4, while still flowing the cooling medium through the cooling member, as a whole, from its central portion to its external peripheral portion, and in this case it would be possible to anticipate a similar cooling performance while still avoiding stagnation of air bubbles within the cooling conduit. It was confirmed that, by employing a finer flow conduit 118 having a groove depth of 4 mm, a groove width of 5 mm, a groove cross sectional area of 16 mm, and twelve folded back places, with the space between one groove and the next one parallel to it being 7 mm, a cooling capability was provided that was equivalent to that obtained with the cooling member of FIG. 4, when cooling water of the same temperature was supplied at the same flow speed.

A side view of the cooling member 111 when the sealing member 129 had been attached thereto is shown in FIG. 8A. FIGS. 8B and 8C show cross sections of FIG. 8 in planes shown by C-C and D-D respectively. The sealing member 129 was formed so as to follow around the four sides of the external periphery of the cooling member 111, thus surrounding the flow conduit 118, and was located at a position spaced by, for example, around 5 mm inside from the external edge of the cooling member 111, so as to seal between the external periphery of the cooling member 111 and the corresponding side of the parallelepiped cell 101 on that side of the cooling member 111. It should be understood that the other reference symbols are the same as in FIG. 4. Furthermore, the sealing member 129 was also formed to extend along the sides of the isolation walls 118a defining the flow conduit 118 running inside the cooling member 111, so as to seal between those isolation walls 118a and the corresponding side of the parallelepiped cell 101 on that side of the cooling member 111. This sealing member was made from ethylene-propylene rubber, and its height was 0.2 mm.

A charge/discharge test was performed for the battery module of FIG. 3 with the setup (i.e. with the assembled battery system) shown in FIG. 7. Ethylene glycol was used for the cooling medium, and a flow rate for each of the cooling members 111 of 30 cc/min was established. It was arranged for a signal to be sent by the control device 126 to the liquid impulsion device 112 to increase the flow rate, when the amount of heat generated by the battery was large. The amount of heat generated by the battery can be measured as a function of the current flowing through the battery, and the cooling medium flow rate in proportion to this amount of heat generation can be stored as a program in the control device 126 on the basis of this data.

Furthermore, a radiator was used as the heat exchange device 121, and cooling air was supplied to this heat exchange device 121 so that the temperature of the cooling medium after it had passed through the heat exchange device 121 was 25° C. As a method for controlling the cooling when the amount of heat generated by the battery fluctuates, apart from the previously described method of varying the flow rate, it would also be acceptable to adopt the method of controlling the amount of heat exchanged performed by the heat exchange device 121.

A thermocouple was fixed in the neighborhood of the connection portion 115 of the cooling medium supply pipe 113, and was located on the side surface of the non-aqueous electrolyte secondary cell 101 of FIG. 3 (i.e. upon its surface that was 200 mm high and 10 mm wide).

After having installed the cooling members of the structure shown in FIG. 4, a charge/discharge cycle test of the battery module system having the structure shown in FIG. 7 was performed in the following manner. However it should be understood that, while in FIG. 7 only two of the parallelepiped cells 101 and one of the cooling members 111 is shown.

First, charging was started at a current that was capable of charging up the rated capacity of the battery module in two hours, and constant voltage charging was performed until the battery voltage reached an upper limit voltage (normally a constant value in the range of 4.0 to 4.2 V). Then discharge was started at a current that was capable of discharging the rated capacity of the battery module in two hours at its rated discharge current, and discharging was performed until the battery voltage reached a lower limit voltage (normally a constant value in the range of 2.5 to 3.0 V). It should be understood that the upper limit voltage and the lower limit voltage are determined according to the material used for the battery module, and according to the amount and the composition thereof and so on. This charge/discharge cycle test was performed by continuously performing charging and discharging for four hours in this manner. During the charge/discharge cycle test, the result in terms of cooling the battery module using the cooling construction for a battery module of the present invention was that it was possible to control the temperature of all of the cells to remain within a temperature range of 35±2° C.

Thus it was seen that, by applying this embodiment of the present invention in this manner, it is possible to reduce the temperature fluctuations of the battery module system that includes these non-aqueous electrolyte secondary cells.

Comparison Example 1

Ten cells were manufactured to be the same as those used for the test of the embodiment of the present invention described above, and they were assembled into a 10-in-series module as described below.

$LiMn_2O_4$ was used for the positive electrode active material and natural graphite was used for the negative electrode active material, and polyvinylidene fluoride was used for the binders of both electrodes. The rated capacity of the cells were 40 Wh.

Next, in order to produce a structure similar to the one shown in FIG. 3, a cooling member 111, a cooling medium supply pipe 113, a cooling medium ejection pipe 114, end plates 112, reinforcement plates 117, and so on were assembled. In this case again, with the exception of its connection portions 115, the cooling member 111 was formed in a parallelepiped shape, and its external dimensions were: height 200 mm, width 100 mm, and thickness 4 mm. While the conduit pattern generally resembled the shape shown in FIG. 4, the link portions 119 of FIG. 4 (i.e. the reinforcing and separation portions) were, in this case, formed as elongated link portions 119*a* extending along the entire flow conduit 118 (refer to FIG. 9). In other words, grooves of width 20 mm and depth 1.75 mm were provided on both sides of the link portions 119*a*, with these grooves respectively contacting the sides of the two parallelepiped cells 101 that sandwich this cooling member 111 between them.

Figure 9:
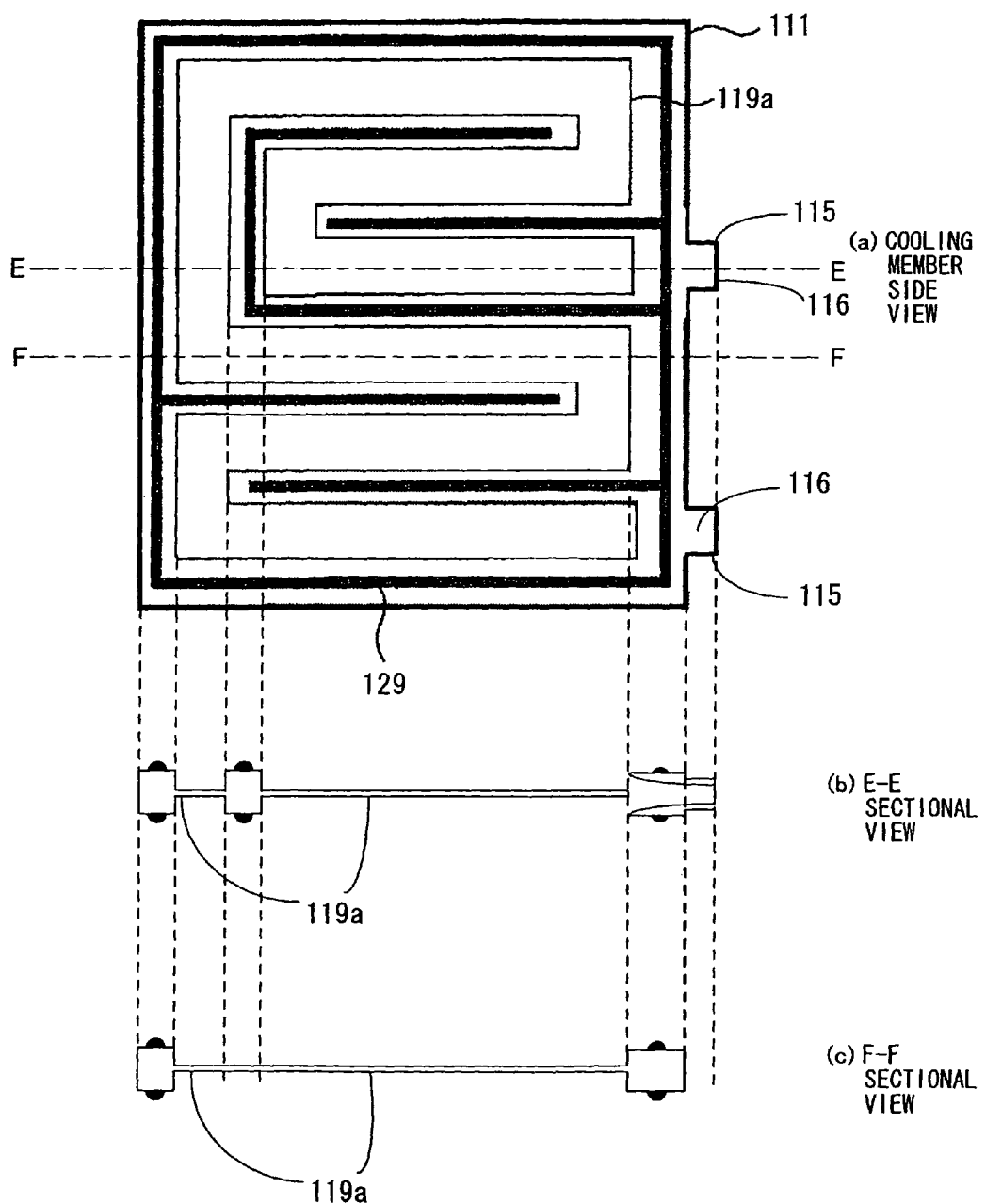
FIG. 9 shows a side view and its sectional views of a cooling member of a comparison example that is provided with a seal. (a) represents the side view of the cooling member. (b) is the sectional view of (a) in the position E-E, and (c) is the sectional view of (a) in the position F-F.

The comparison example shown in FIG. 9 is a variant embodiment of the construction for the cooling member shown in FIGS. 4 and 7, and is shown in FIG. 9 as being fitted with a sealing member, just like the cooling member shown in FIG. 8. The link portions 119 (i.e. separation portions) previously described are, in FIG. 9, formed as the link portions 119*a*. As shown in FIG. 9, in this comparison example, there is provided a construction in which the two flow conduits that contact the two parallelepiped cells 101 that sandwich the cooling member 111 between them are completely separated from one another, so that the cooling medium flows that cool these two cells 101 do not mix together at all. When the cooling member 111 shown in FIG. 9 is used, the degree of heat exchange between each pair of non-aqueous electrolyte secondary cells is reduced, as compared to the case of using the cooling member 111 shown in FIG. 8. A charge/discharge test was performed upon the structure (the battery module system) of FIG. 7, in which the cooling member 111 shown in FIG. 9 was now used. Water with added ethylene glycol was used as the cooling medium, and a flow rate for each of the cooling members 111 of 30 cc/min was established.

Furthermore, a radiator was used as the heat exchange device 121, and cooling air was supplied to this heat exchange device 121 so that the temperature of the cooling medium after it had passed through the heat exchange device 121 was 25° C. And a thermocouple was fixed in the neighborhood of the connection portion 115 of the cooling medium supply pipe 113, and was located on the side surface of the non-aqueous electrolyte secondary cell 101 of FIG. 3 (i.e. upon its surface that is 200 mm high and 10 mm wide).

The battery module system of FIG. 7 was subjected to a charge/discharge cycle test similar to the one performed with the present invention as described above. The result was that the temperatures of all of the cells varied within the temperature range of 35±4° C., of which temperature variation became larger.

As explained above, the present invention can be applied to various types of power supply in which a plurality of non-aqueous electrolyte secondary cells are combined into an assembled battery system.

While various embodiments and variant embodiments have been explained above, the present invention is not to be considered as being limited by the details thereof. Other possibilities that may be considered to lie within the scope of the technical concept of the present invention are also included within the range of the present invention.

What is claimed is:

1. An assembled battery system comprising:
   at least two non-aqueous electrolyte secondary cells and at least two parallelepiped cell cases, each of the secondary cells is installed in one of the at least two parallelepiped cell cases and comprises a positive electrode that occludes and emits lithium ions, a negative electrode that occludes and emits lithium ions, and a non-aqueous electrolyte comprising an electrolyte dissolved in a non-aqueous solvent, wherein:
   the non-aqueous electrolyte secondary cells are arranged so that each of larger area sides of an adjacent pair of the parallelepiped cell cases face in parallel one another;
   a cooling member is provided between the adjacent pair of the parallelepiped cell cases;
   the cooling member comprises an opening portion and an isolating wall, which define a cooling medium flow conduit between two of the larger area sides of the adjacent pair of the parallelepiped cell cases;

the cooling member further comprises a cooling medium supply of inlet and a cooling medium exit outlet, and the opening portion is communicated with the supply inlet and the exit outlet;

the supply inlet and the exit outlet are formed on one side of the cooling member that does not face the adjacent pair of the parallelepiped cell cases, with the supply inlet being provided more towards a center of the one side of the cooling member than the exit outlet; and the flow conduit extends from the supply inlet towards a central portion of the cooling member and then turns to a peripheral portion of the cooling member, and finally arrives at the exit outlet.

2. An assembled battery system according to claim 1, wherein a sealing member is provided along a surface of the isolating wall that opposes a side surface of an adjacent non-aqueous electrolyte secondary cell, and the cooling member and the adjacent non-aqueous electrolyte secondary cell are sealed together by the sealing member.

3. An assembled battery system according to claim 2, wherein: an end portion of a supply pipe connected to the supply inlet and an end portion of an ejection pipe connected to the exit outlet are linked into a loop by a circulation pipe, and a cooling medium circulation device and a heat exchange device are installed in the circulation pipe; and the cooling medium is supplied from the circulation pipe into the supply pipe, and is discharged from the ejection pipe into the circulation pipe.

4. An assembled battery system according to claim 3, wherein the cooling medium is a mixture of a glycol type substance and water, or is a fire-retardant cooling medium that is a mixture of one or more of a phosphoric acid ester substance, a phosphorous acid ester substance, or a fatty acid ester substance, or a mixture of one or more of these with mineral oil.

5. An assembled battery system according to claim 1, wherein:

an area ratio of the flow conduit formed at the peripheral portion of the cooling member is greater than an area ratio of the flow conduit formed at the central portion of the cooling member.

6. An assembled battery system according to claim 1, wherein:

a groove width of the flow conduit at the peripheral portion of the cooling member is from 1.5 to 2 times greater than a groove width of the flow conduit at the central portion of the cooling member, with the groove width being measured along the one side of the cooling member.

7. An assembled battery system according to claim 1, wherein:

the cooling member is provided between each adjacent pair of the parallelepiped cell cases, with supply inlets of cooling members being connected to a cooling medium supply pipe and exit outlets of cooling members being connected to a cooling medium ejection pipe.

8. An assembled battery system comprising:

at least two non-aqueous electrolyte secondary cells;

at least two parallelepiped cell cases, each one of at least two parallelepiped cell cases enclosing one of the at least two non-aqueous electrolyte secondary cells, larger area sides of an adjacent pair of the parallelepiped cell cases facing and being parallel to one another;

a cooling member disposed between the adjacent pair of the parallelepiped cell cases, the cooling member comprising an opening portion and an isolating wall defining a cooling medium flow conduit between two of the larger area sides of the adjacent pair of the parallelepiped cell cases, the cooling member comprising a cooling medium supply inlet and a cooling medium exit outlet, the opening portion communicating with the supply inlet and the exit outlet, the supply inlet and the exit outlet being formed on one side of the cooling member not facing the adjacent pair of the parallelepiped cell cases, the supply inlet being provided more towards a center of the one side of the cooling member than the exit outlet, and the flow conduit extending from the supply inlet to a central portion of the cooling member and then to a peripheral portion of the cooling member before finally extending to the exit outlet.

* * * * *